United States Patent
Rutter

[15] 3,686,896
[45] Aug. 29, 1972

[54] END FITTINGS FOR FLEXIBLE DRIVE CABLES

[72] Inventor: Kenneth A. Rutter, Bushey Heath, England

[73] Assignee: Smiths Industries Limited, London, England

[22] Filed: Sept. 29, 1969

[21] Appl. No.: 861,930

[52] U.S. Cl. ...................64/4, 287/119, 285/319, 285/320, 285/423
[51] Int. Cl. ...................................F16g 1/06
[58] Field of Search ..285/319, 320, 7, 423; 287/119; 24/201 A, 230 BC, 230 C, 230 G, 230 LP, 230 B, 230 SH, 230 TC, 230 CF, 230 F, 230 BL, 230 SC, 230 SL; 334/91; 64/4

[56] References Cited

UNITED STATES PATENTS

| | | | |
|---|---|---|---|
| 3,602,009 | 9/1969 | Powell | 64/4 |
| 3,234,757 | 2/1966 | Stadelmann | 64/4 |
| 3,328,977 | 7/1967 | Wallis | 64/4 |
| 1,086,312 | 2/1914 | Blaha | 285/320 |
| 3,245,698 | 4/1966 | Fromkneuht | 285/319 X |
| 3,417,365 | 12/1968 | Krehbiel | 287/119 R X |

*Primary Examiner*—Dave W. Arola
*Attorney*—William D. Hall, Elliott I. Pollock, Fred C. Philpitt, George Vande Sande, Charles F. Steininger and Robert R. Priddy

[57] ABSTRACT

An end fitting for attaching the outer sheath of a flexible drive cable to an annularly grooved spigot, comprises a hollow generally cylindrical plastics body having a longitudinally directed closed-ended slot. One end of a resilient arm disposed within the slot is integrally moulded to the end of the slot remote from the outer sheath and has its opposite end formed with an inwardly directed projection for co-operation with the spigot's annular groove. A release lever extending longitudinally and outwardly of the hollow plastics body away from the outer sheath is integrally moulded to the arm so as to be connected thereto by one end, the opposite end being free. To release the end fitting from its engagement of the spigot, the free end is depressed to cause the projection to move outwardly of the body and out of the spigot's annular groove, and the end fitting is thus free to be pulled longitudinally away from the spigot.

3 Claims, 5 Drawing Figures

KENNETH A. RUTTER

END FITTINGS FOR FLEXIBLE DRIVE CABLES

Flexible drive cables consist of a flexible elongate inner drive shaft that in use transmits rotary or linear movements, disposed within a flexible elongate outer sheath (commonly including a helically coiled metal strip). A flexible drive cable assembly is formed by the attachment of an end fitting to one end of the outer sheath, the flexible drive cable assembly being in use held substantially immovably at that end by connection of the end fitting to a fixture. This invention relates to end fittings for flexible drive cables and particularly but not exclusively to flexible drive cable assemblies for the transmission of rotary movements.

According to one aspect of this invention there is provided an end fitting for attachment to the outer sheath of a flexible drive cable, comprising a hollow body of plastics material having one end portion adapted to be attached to the outer sheath of the flexible drive cable thereby to form a flexible drive cable assembly, characterized in that the opposite end portion terminates in a wall defining a continuous closed internal contour for the hollow body, and in that the portion of the hollow body intermediate the end portion is provided with latching means comprising an aperture through the wall of this intermediate portion of the hollow body, in which aperture there is disposed at least part of an arm that is integral at one end with the body and that is provided with a projection resiliently urged by the arm so as normally to project through the aperture and internally of the hollow body.

Preferably the aperture is a longitudinally directed slot.

Preferably the end fitting further comprises a manually operable release lever that is free at one end and is integral at its other end with said arm. The said release lever may have its free end directed longitudinally of the body, preferably towards said opposite end portion of the hollow body. Lateral ribs may be formed adjacent said free end to facilitate manual operation of the release lever.

The said contour may be constituted by a plurality of arcuate surfaces that are separated by surfaces, preferably flat, which project slightly inwardly of the arcuate surfaces. Alternatively the said contour may be circular.

Preferably, the hollow body is provided with an inwardly and radially directed shoulder between said one end portion and the latching means.

Preferably, the end fitting is provided with an inwardly and radially directed annular wall integral with said hollow body, said wall dividing said one end portion of the body from said intermediate portion of the body. A rubber sealing washer or sleeve may be disposed in said hollow body with one lateral face arranged to abut said shoulder, or alternatively to abut said wall.

Preferably, a flexible cylindrical seal is disposed within the intermediate portion of the hollow body with its one edge integral with said intermediate portion and its opposite edge directed towards said opposite end portion.

According to another aspect of this invention there is provided a flexible elongate outer sheath for a flexible drive cable assembly having attached to one end thereof by its one end portion an end fitting according to said one aspect of the invention. The said one end portion may be bonded to the outer sheath, or be clamped by a swaged collar to the outer sheath, or the fitting may be moulded in situ to the end of the outer sheath.

According to yet another aspect of this invention there is provided a flexible drive cable assembly comprising a flexible elongate inner drive shaft encompassed by a flexible elongate outer sheath as has been set out above.

Preferably the longitudinal dimension of the hollow body is such that the said opposite end portion of the hollow body normally projects beyond the end of the elongate inner drive shaft.

An exemplary embodiment of this invention will now be described with reference to the accompanying drawings of which FIG. 1 shows an end fitting according to this invention in longitudinal cross-section attached to the outer sheath of a flexible drive cable and connected to the spigot of an instrument such as a speedometer;

Figure 2:
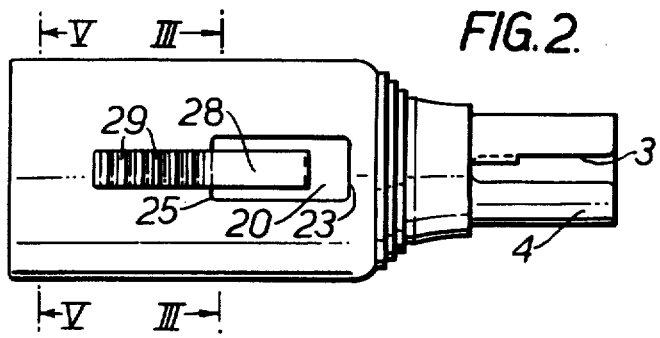
FIG. 2 is a plan view of the end fitting of FIG. 1.
Figure 3:
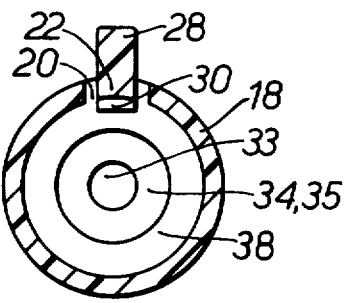
FIG. 3 is a cross-sectional view taken along the line III—III of FIG. 2.

As shown in the drawings the end fitting comprises a thin-walled hollow body 2 of plastics material (such as an acetal copolymer, e.g., that sold in the U.K. under the Trade Mark HOSTAFORM) having a tubular end portion 4 that is formed with a plurality of slots 3 and that is clamped to the outer sheath 6 of a flexible drive cable 8 by swaging a metal collar 5. As best shown in FIG. 2, the bottom portion 3a of one marginal edge of each slot 3 is disposed slightly outwardly from the remainder of tubular portion 4. Alternatively, the tubular end portion 4 may be unbroken and may be bonded to or in situ moulded on to the outer sheath 6.

The opposite end portion 10 of the body 2 is tubular and has a closed circular internal contour 12 of constant diameter defined by an annular walled region 13. The opening defined by the annularly shaped radial end face 14 of end portion 10 is countersunk to provide an entry chamber 16.

The portion 15 of body 2 intermediate end portions 4 and 10 is provided through its periphery 18 with aperture comprising a longitudinal, closed-ended slot 20 (see FIG. 2).

A resilient arm 22 is moulded integrally with the body so that one end 24 of the arm is joined to the closed end 25 of the slot nearest the end portion 10 of the body. The resilient arm 22 normally lies wholly within the slot 20 although it may alternatively have an inner part of it projecting inwardly of the slot. The other end 26 of the arm 22 is substantially free to move and is formed with an integral projection 30 which normally (i.e., in the absence of restraint) projects through slot 20 inwardly of the hollow body. The projection 30 has the inner part of its side face 31 that is directed towards body end portion 10 chamfered as at 32. A release lever 28 is moulded integrally with the resilient arm 22 so that it is joined by one end to the arm 22 along substantially the whole length of arm 22, or almost the whole length of arm 22 from the end 26, the opposite end 27 of lever 28 being directed longitudinally and outwardly of the body 2 towards body end portion 10. The release lever 28 is formed adjacent its end 27 with lateral gripping ribs 29. Depression of release level end 27 towards the axis of the body 2 causes the projection 30 of resilient arm 22 to move generally radially outwards of the body until it no longer projects inwardly of the hollow body.

Figure 4:
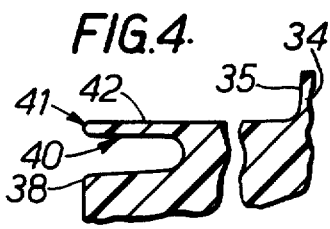
FIG. 4 is an enlarged cross-sectional view of part of the end fitting when disconnected from the instrument's spigot.

An annular wall 34 moulded integrally with and internally of the hollow body 2 divides end portion 4 and intermediate portion 15, the elongate inner drive shaft 7 of flexible drive cable 8 passing through the central hole 33 in wall 34. A metal or plastic bushing 36, swaged or moulded to the flexible inner drive shaft 7 and through which the latter passes, acts by abutment of wall face 35 as a stop to movement of the flexible inner drive shaft 7 away from the body end portion 10 which latter is of such longitudinal dimension as to normally project beyond the square cross-section end (shown by broken lines in FIG. 1) of the flexible inner drive shaft 7. The hollow body 2 is formed with an inwardly and radially directed annular shoulder 38 between the annular wall 34 and the nearest closed end 23 of the slot 20. The inner periphery of shoulder 38 is formed integrally with a resilient cylindrical lip 40 (FIG. 4) whose free edge 41 is in line with shoulder 38 and whose inner cylindrical face 42 is in line with the outer periphery of annular wall 34 when the lip is unstressed.

Figure 1:
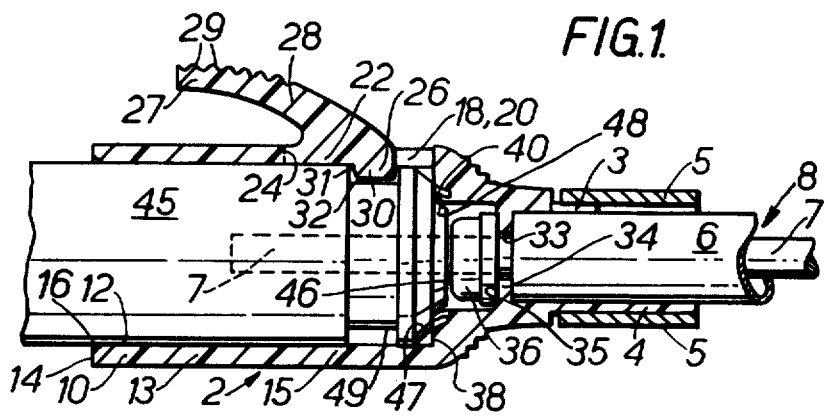

As shown in FIG. 1 the end fitting is releasably connected to the spigot 45 of a vehicle speedometer or odometer instrument (not shown) that is to be secured to the facsia of the vehicle. The squared end of the elongate inner drive shaft 7 drivingly engages in the instrument's input spindle (not shown) within the spigot 45. The spigot end 46 is peripherally chamfered at 48 and a circular groove 49 is formed in the spigot periphery adjacent this end 46, a chamfer 47 being provided between the groove 49 and the spigot end 46. To connect the flexible drive cable assembly to the instrument, the end fitting is pushed axially of the spigot 45 with end portion 10 leading. As the spigot chamfer 47 is engaged by the projection chamfer 32, the projection 30 moves outwardly of the hollow body 2 against the inward coercion of resilient arm 22 and permits the end fitting to move further on to the spigot 45, whilst the chamfer 48 forces the cylindrical lip 40 radially outwardly so that it provides a seal. As soon as the groove 49 is in line with the projection 30, the latter snaps into the groove under the action of resilient arm 22 and a firm connection is thereby achieved. For inspection, servicing, or replacement the flexible drive cable assembly may be disconnected from the instrument by one hand simply by depressing the release lever 28 and pulling the end fitting longitudinally away from the instrument.

It will be appreciated that since the end portion 10 projects beyond the squared end of inner drive shaft 7, the end portion 10 in moving over the surface of the spigot 45 causes the inner drive shaft to be in axial alignment with the instrument's input spindle just prior to entry of the inner drive shaft into the input spindle and thereby such entry is facilitated.

The other end (not shown) of the flexible drive cable 8 may have a similar end fitting attached to the outer sheath 6 for connection to the spigot of the vehicle gear-box. The inner drive shaft 7 at this end is not provided with the bushing 36 so that the inner drive shaft 7 may be removed. Instead of providing a seal by means of the lip 40, a sealing washer or sleeve (not shown) may be located in the hollow body of this end fitting in engagement with the wall 34 and/or the shoulder 38.

Figure 5:
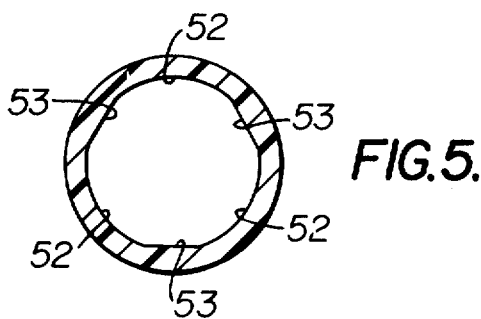
FIG. 5 is a cross-sectional view taken along the section line V—V of FIG. 2.

Because the dimensional tolerances of manufacturing the end fittings and the spigots to which they are to be connected, some connections might be too loose and others might be too tight. Consequently the closed internal contour 12 instead of being circular may comprise a plurality of arcuate surfaces 52 that are separated by flat surfaces 53 (subtending substantially smaller angles at the body axis than the arcuate surfaces), which flat surfaces project slightly inwardly of the arcuate surfaces, all as shown in the cross-sectional view of FIG. 5. Where an otherwise overtight connection would arise, the flat surfaces grip the spigot whilst the arcuate surfaces distort or deform slightly.

What is claimed is as follows:

1. A flexible drive cable assembly comprising:
   a flexible elongate sheath;
   an end fitting comprising a hollow body having wall means defining a passageway that extends longitudinally of said body from one end thereof to the other end thereof and attached by said one end to an end of said flexible elongate sheath; and
   a flexible elongate drive shaft disposed within said sheath;
   the end fitting being characterized in that the wall means at said other end of the hollow body define therein a continuous closed contour for the passageway comprising a plurality of arcuate surfaces that are separated by surfaces which project slightly inwardly of the arcuate surfaces, and in that the wall means at a portion of the hollow body intermediate its ends define therein, with a continuous closed contour, an aperture extending through said wall means;
   said end fitting being further characterized by the provision of latching means comprising a resilient arm having at one end thereof a projection that normally extends through the aperture inwardly of the hollow body so as to terminate within said passageway;
   said end fitting having means holding positively fast with said hollow body an opposite end of the resilient arm, said holding means encompassing said passageway and positioning said arm longitudinally of the hollow body with said projection directed toward said passageway;
   said end fitting also comprising a manually operable release lever having one end free and disposed exteriorly of said passageway beyond said resilient arm, and having its other end joined to said resilient arm at a location spaced from said opposite end of the resilient arm.

2. A flexible drive cable assembly comprising:
   a flexible elongate sheath;
   an end fitting comprising a hollow body having wall means defining a passageway that extends longitudinally of said body from one end thereof to the other end thereof and attached by said one end to an end of said flexible elongate sheath; and a flexible elongate drive shaft disposed within said sheath;

the end fitting being characterized in that the wall means at said other end of the hollow body define therein a continuous closed contour for the passageway and in that the wall means at a portion of the hollow body intermediate its ends define therein, with a continuous closed contour, an aperture extending through said walls means;

a resilient seal disposed within the intermediate portion of the hollow body, said seal having the general form of a cylinder and being integral at one end with said intermediate portion, the opposite end being directed toward said other end of the hollow body;

said end fitting being further characterized by the provision of latching means comprising a resilient arm having at one end thereof a projection that normally extends through the aperture inwardly of the hollow body so as to terminate within said passageway;

said end fitting having means holding positively fast with said hollow body an opposite end of the resilient arm, said holding means encompassing said passageway and positioning said arm longitudinally of the hollow body with said projection directed toward said passageway;

said end fitting also comprising a manually operable release lever having one end free and disposed exteriorly of said passageway beyond said resilient arm, and having its other end joined to said resilient arm at a location spaced from said opposite end of the resilient arm.

3. An end fitting for attachment to a flexible drive cable's outer sheath, comprising a hollow body of plastic material having:

a. a first end portion for said attachment, b. a second end portion opposite said first end portion and terminating in a wall defining a continuous closed internal contour for the hollow body, c. an intermediate portion integral with and between said first and second portions to provide a generally cylindrically wall, d. a resilient cylindrical seal disposed within said intermediate portion in annularly spaced relation with respect to said generally cylindrical wall, said cylindrical seal having one annular edge integrally connected to said generally cylindrical wall and having its opposite annular edge free, e. a longitudinally directed slot having closed ends in said generally cylindrical wall, f. an elongate arm directed longitudinally of said hollow body and moulded by one end integrally with said hollow body to have at least part thereof longitudinally disposed in said slot, g. a projection moulded integrally with the other end of said arm, said projection being directed substantially radially inwardly of said generally cylindrical wall and being resiliently urged by said arm so as normally to extend through said slot and project internally of said generally cylindrical wall, h. a manually operable release lever integral at one end with said arm at a location spaced from said one end of the arm and at least adjacent said other end of the arm, and having its opposite end free and directed longitudinally of the body.

* * * * *

PO-1050
(5/69)

UNITED STATES PATENT OFFICE
CERTIFICATE OF CORRECTION

Patent No. 3,686,896            Dated August 29, 1972

Inventor(s) KENNETH AUGUSTINE RUTTER

It is certified that error appears in the above-identified patent and that said Letters Patent are hereby corrected as shown below:

Foreign Application Priority Data

November 15, 1968   Great Britain.......54208/68

Signed and sealed this 23rd day of January 1973.

(SEAL)
Attest:

EDWARD M. FLETCHER, JR.
Attesting Officer

ROBERT GOTTSCHALK
Commissioner of Patents